United States Patent [19]

Midorikawa et al.

[11] Patent Number: 4,712,891
[45] Date of Patent: Dec. 15, 1987

[54] VEHICLE DOOR MIRROR WITH HOUSING AND BASE PART INCLUDING A SOFT FLEXIBLE MATERIAL

[75] Inventors: Masashi Midorikawa, Wako; Isamu Inoh, Tokyo, both of Japan

[73] Assignee: Honda Giken Kogyo Kabushiki Kaisha, Tokyo, Japan

[21] Appl. No.: 875,136

[22] Filed: Jun. 17, 1986

[30] Foreign Application Priority Data

Jun. 18, 1985 [JP] Japan ................................ 60-132196
Jun. 18, 1985 [JP] Japan ................................ 60-132197

[51] Int. Cl.⁴ ........................... G02B 7/18; B60R 1/06
[52] U.S. Cl. ..................... 350/604; 350/632; 248/549; 248/900
[58] Field of Search ................ 350/632, 635, 604; 248/549, 900, 476, 479; 296/84 B

[56] References Cited
U.S. PATENT DOCUMENTS 4,357,076 11/1982 Manzoni ...................... 350/635

FOREIGN PATENT DOCUMENTS

| | | | |
|---|---|---|---|
| 973940 | 7/1960 | Fed. Rep. of Germany | 350/635 |
| 1555515 | 11/1969 | Fed. Rep. of Germany | 248/900 |
| 2546759 | 4/1977 | Fed. Rep. of Germany | 248/900 |
| 2829492 | 1/1980 | Fed. Rep. of Germany | 350/635 |
| 74857 | 1/1961 | France | 248/900 |
| 7734 | 1/1982 | Japan | 350/635 |
| 1578950 | 11/1980 | United Kingdom | 350/635 |
| 2105276 | 7/1982 | United Kingdom | 350/635 |

*Primary Examiner*—Jon W. Henry
*Attorney, Agent, or Firm*—Armstrong, Nikaido, Marmelstein & Kubovcik

[57] ABSTRACT

A vehicular door mirror having a base part mounted to a vehicle body and a housing rotatably supported on the base part and incorporated with a mirror, in which a deflectable soft material having a high elasticity is used for forming the base part and housing in order to permit rotation or pivotal motion of the housing towards vehicle front side, this leading to an increased degree of freedom in door mirror design.

9 Claims, 3 Drawing Figures

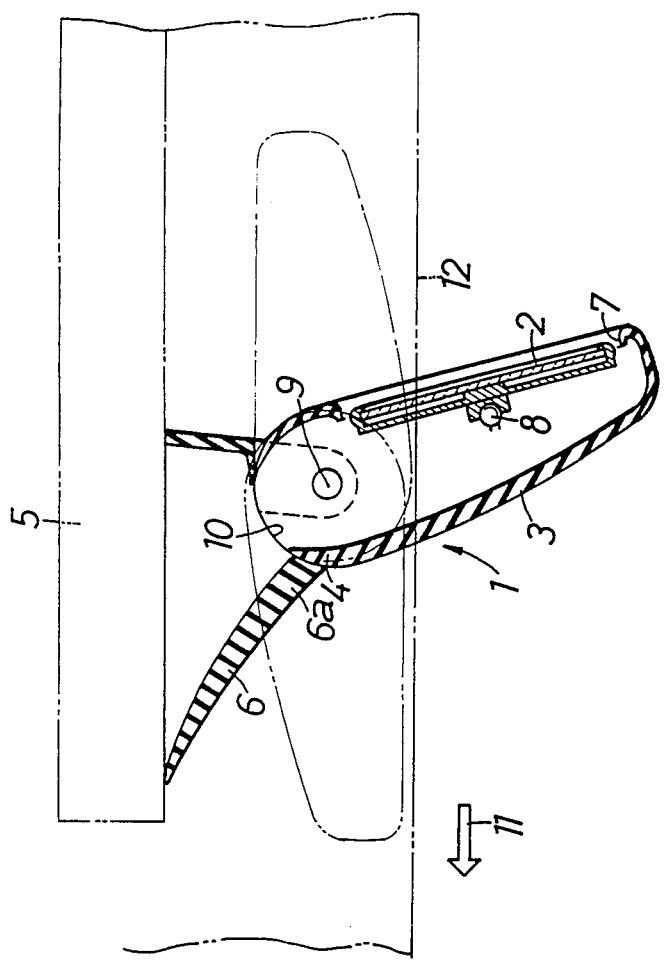

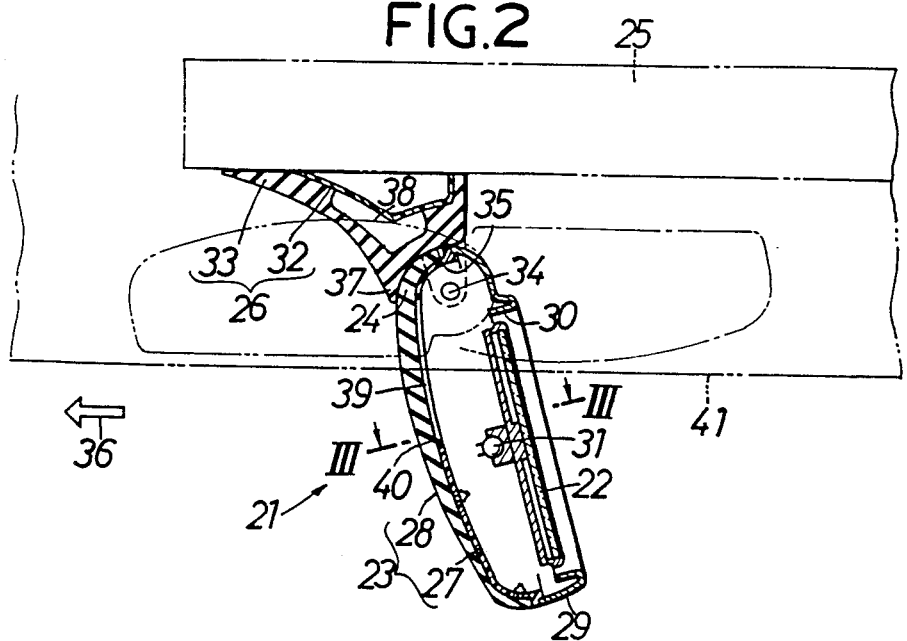
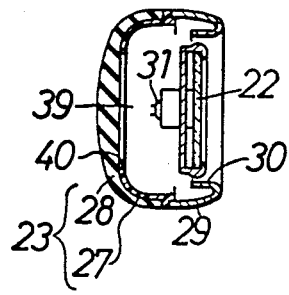

VEHICLE DOOR MIRROR WITH HOUSING AND BASE PART INCLUDING A SOFT FLEXIBLE MATERIAL

BACKGROUND OF THE INVENTION

1. Field of the Invention

The present invention relates to a door mirror of a vehicle in which a housing that rotatably supports a mirror is held at its base end on a base part mounted to a door of the vehicle in such manner that the housing is rotatable around a substantially vertical axis.

2. Description of the Prior Art

Conventional vehicle door mirror has its housing located in a normal position thereof projecting sidewards outside the lateral end edge of the vehicle. Accordingly, in that door mirror, in addition to its inclinable or pivotable structure toward the rear of the vehicle, it has been designed also to allow the housing to be pivotable toward the vehicle front upon receipt of any external force from a rear side.

In case of a door mirror of the mentioned type, since its housing is formed projecting sidewardly farther than the lateral end edge of the vehicle, it is desirable that the configuration of the housing on its vehicle front side should be approximate to a streamline, but at the same time the housing must be permitted its inclining toward vehicle front and rear sides. This results in limiting of the degree of freedom in design aspect.

SUMMARY OF THE INVENTION

The present invention has been contemplated in view of the above and has as its object the provision of a door mirror which includes a housing inclinable toward front and rear of the vehicle and would permit more freedom in design in view of aerodynamics.

In order to achieve the above object, according to the invention, there is provided a door mirror of a vehicle comprising a base part mounted to a vehicle body and a housing which is supported on the base part rotatably around a substantially vertical axis and which is provided with a mirror, wherein portions of the base part and the housing that come into abutment against each other when the housing is rotated towards a front of the vehicle are formed of a soft material having a flexibility.

According to further aspect of the invention, there is provided a door mirror of a vehicle comprising a base part mounted to a vehicle body and a housing which is supported on the base part rotatably around a substantially vertical axis and which is provided with a mirror, wherein at least surfaces of the housing and the base part are formed of a soft material which is flexible for permitting rotation of the housing towards a front of the vehicle.

With the above-described arrangement, when the external force is applied to the housing in a front direction of the vehicle, the housing is permitted to rotate frontwards irrespective of its configuration, particularly of that of its surface facing vehicle front in the normal position of the door mirror, or the configuration of the base part in abutment against the housing. Therefore, the door mirror can be designed into a more preferable configuration in view of air resistance and external appearance.

The above and other objects, features and advantages of the invention will be readily apparent from the following detailed description of preferred embodiments while referring to the accompanying drawings.

BRIEF DESCRIPTION OF THE DRAWINGS

The drawings show preferred embodiments according to the invention, in which FIG. 1 shows a schematic horizontal sectional view of a door mirror according to the first embodiment, FIG. 2 shows a schematic horizontal sectional view of a door mirror according to the second embodiment, similar to FIG. 1, and FIG. 3 shows a sectional view taken along the line III—III of FIG. 2.

DESCRIPTION OF PREFERRED EMBODIMENTS

Some embodiments of the present invention will be described hereunder with reference to the attached drawings.

Referring to FIG. 1 which shows a first embodiment, a door mirror 1 has a mirror 2 which is pivotally supported by a housing 3 whose proximal or base end 4 is supported by a base part 6 mounted on a door 5 such that the housing 3 is pivotable about a substantially vertical axis.

The housing 3 has a hollow interior and is integrally molded out of a soft material having a flexibility and an elasticity, e.g., a soft rubber or a synthetic resin such as urethane and has an opening 7 which faces rearwardly (the right-hand side of FIG. 1) of the vehicle when the housing 3 is in its normal position as illustrated. The mirror 2 is disposed in the opening 7. The mirror 2 is supported by the housing 3 through a spherical pivot 8, so that the mirror 2 is allowed to pivot in any direction about the pivot 8.

In addition, an actuating mechanism (not shown in the drawings) is accommodated in the housing 3. By activating the mechanism by remote control from a passenger room, the mirror 2 is rotated in a desired direction.

The base part 6 is integrally molded out of a soft material, e.g., a soft rubber or a synthetic resin such as urethane, similarly as the housing 3. The base end 4 of the housing 3 is pivotally supported at a tip end of the base part 6 through a support shaft 9 having an axis extending substantially vertically.

The base end 4 of the housing 3 is shaped into a circular arc in its horizontal cross-section. The tip end of the base part 6 is provided with a sliding surface 10 which has a circular arcuate cross-section in conformance with the configuration of base end 4 so as to surround the shaft 9 while being in sliding contact with the base end 4.

The sliding surface 10 is formed such that, when the housing 3 is in its normal position as illustrated, the area of the sliding surface 10 in contact with the base end 4 is relatively large toward the front end 11 of the vehicle, indicated by the arrow, and is relatively small toward the rear end of the vehicle. In other words, the base part 6 is provided at its tip end with a surrounding extension 6a which extends around the base end 4 toward the front end 11 of the vehicle and surroundingly contacts the base end 4 in the normal position of the housing 3.

In addition, the base part 6 is hollow in its interior, and therefore the base part 6, particularly the extension 6a, can deflect inwardly relatively easily.

The operation of this embodiment will be described below. When the housing 3 is in its normal position as illustrated, it projects sidewards beyond the lateral end edge 12 of the vehicle. The housing 3 is pivoted toward the rear of the vehicle when, for example, the vehicle is parked in a relatively narrow space. At this time, the housing 3 inclines towards the rear of the vehicle while rotating around the support shaft 9 and sliding at its base end 4 on the sliding surface 10, until the housing 3 becomes almost parallel to the side face of the vehicle body.

When external force acts on the housing 3 in its normal position from the rear side of the vehicle, the extension 6a of the base part 6 and the housing 3 are deflected by each other at their abutting portions, since each of the base part 6 and the housing 3 is made of an elastic soft material, so that the housing 3 can also incline toward the front 11 of the vehicle. Here, the hollow interiors of the base part 6 and the housing 3 serve to receive their deflected portions.

Thus, the housing 3 is allowed to pivot toward the front 11 of the vehicle owing to the formation of the housing 3 and the base part 6 out of a soft material. In consequence, even if the configuration of the housing 3, particualrly that of a front side portion of the housing 3, is variously changed in view of air resistance, the housing 3 is still assured its inclinability or pivotability toward the front of the vehicle, so that it is possible to increase the degree of freedom in design of the housing. Accordingly, a vehicle can be equipped with a door mirror of such external appearance, for example, as more approximate to a streamline than conventional mirrors.

Although the whole of each of the base part 6 and the housing 3 is made of a soft material in the above-described embodiment, it may be sufficient for at least the surfaces of the base part 6 and the housing 3 to be made of a soft material.

The second embodiment illustrated in FIGS. 2 and 3 show such example.

More specifically, a housing 23 of a door mirror 21 is constituted by a surface member 28 being provided onto the surface of a core member 27. A visor 29 which is made of a rigid material, e.g., a synthetic resin or a diecast material, is mounted on that portion of the housing 23 which faces the rear of the vehicle when the housing 23 is in its normal position as shown in FIG. 2. The visor 29 is provided with an opening 30 which faces the vehicle rear side. The mirror 22 is disposed in the opening 30 and is supported by the housing 23 through a spherical pivot 31, similarly as the first embodiment, so that the mirror 22 is allowed to pivot in any direction about the pivot 31 and is further operated from a remote place.

In addition, the core member 27 is made of a rigid material, e.g., a synthetic resin or a metal such as a diecast metal, while the surface member 28 is made of a soft material, e.g., a soft rubber or a synthetic resin such as urethane which corresponds to the material forming the housing 3 and the base part 6 of the first embodiment.

The base part 26 is composed of a core member 32 and a surface member 33 which is provided on the surface of the core member 32. The core member 32 is made of a rigid material, e.g., a synthetic resin or a metal such as a diecast metal, similar to the case of the housing 23. The surface member 33 is made of a soft material, e.g., a soft rubber or a synthetic resin such as urethane, similar to the surface member 28 of the housing 23.

There may be selected various techniques for providing the surface members 28, 33 on the surfaces of the core members 27, 32, respectively. For example, the surface members 28, 33 may be formed by an undercut molding process and then engaged with the core members 27, 32, respectively; the surface members 28, 33 and the core members 27, 32 may be bonded together, respectively; or the surface members 28, 33 may be provided on the respective surfaces of the core members 27, 32 by an outsert integral molding process. Any of these techniques may be employed.

The base end 24 of the housing 23 is pivotally supported at the tip end of the base part 26 through a support shaft 34 having an axis extending substantially vertically.

The base end 24 of the housing 23 has a circular arcuate configuration in horizontal cross-section similarly to the first embodiment. The tip end of the base part 26 is provided with a sliding surface 35 which has a circular arcuate cross-section in correspondence to the tip end 24 and which is in slide contact with the tip end 24.

Also, that portion of the surface member 33 which is located at the tip end of the base part 26 is provided with a surrounding extension 37 which extends around the tip end 24 toward the front 36 of the vehicle so as to surround and contact the forward side of the tip end 24 in a normal position of the housing 3.

In addition, a relief space 38 is provided inside the surface member 33 between that member 33 and the core member 32. This relief space 38 is located at that portion of the base part 26 against which the housing 23 comes into abutment when pivoted toward the vehicle front side 36, that is, at the extension 37.

Further, a through-hole 40 for defining a relief space 39 on the inner side of the surface member 28 is provided in the core member 27 of the housing 23 at a portion of the housing 3 placed in abutment against the extension 37 when the housing 23 is pivoted toward the front 36 of the vehicle.

The operation of this embodiment will be described below. When external force acts on the housing 3, which is in its normal position as shown in FIG. 2, from the rear side of the vehicle, the respective surface members 28, 33 of the housing 23 and the base part 26 abut against each other and are thereby deflected, since the surface members 28, 33 are made of soft materials having elasticity, so that the housing 23 can also pivot toward the front of the vehicle. At that moment, since the relief spaces 38, 39 are respectively provided on the inner sides of the surface members 28, 33 at their abutting portions, the surface members 28, 33 deflect and flex easilly, so that it is easy for the housing 23 to pivot toward the front 36 of the vehicle.

In the aforementioned two embodiments, even if a door mirror in its rearwardly inclined or pivoted state still projects outside from the lateral end edge of a vehicle body, such projecting part of the mirror has a surface formed of a soft material according to the invention, as a consequence of which any external force that may be applied to the projecting part can be absorbed by the soft material. This leads to an excellent durability and a high safety of the door mirror.

What is claimed is:

1. A door mirror of a vehicle comprising a base part mounted to a vehicle body and a housing which is supported on the base part rotatably around a substantially vertical axis and which is provided with a mirror, wherein portions of the base part and the housing that come into abutment against each other when the housing is rotated towards a front of the vehicle are both formed of a soft material having a flexibility and are, at the time of rotation towards the vehicle front, subject to resilient deformation.

2. A door mirror of a vehicle comprising a base part mounted to a vehicle body and a housing which is supported on the base part rotatably around a substantially vertical axis and which is provided with a mirror, wherein at least surfaces of the housing and the base part are both formed of a soft material which is flexible for permitting rotation of the housing towards a front of the vehicle and said surfaces are both subject to resilient deformation at the time of rotation towards the vehicle front.

3. A door mirror defined in claim 1 or 2, wherein at least one of the base part and the housing is wholly made of the soft material and said at least one of the base part and the housing is provided with a hollow interior.

4. A door mirror defined in claim 1 or 2, wherein each of the base part and the housing comprises a core member made of a rigid material and a surface member surrounding a surface of the core member and made of said soft material.

5. A door mirror defined in claim 1 or 2, wherein when the housing rotated towards the vehicle rear side, the housing and the base part are not subject to resilient deformation.

6. A door mirror of a vehicle comprising a base part mounted to a vehicle body and a housing which is supported on the base part rotatably around a substantially vertical axis and having a mirror thereon, said base part and said housing each having a core member of a rigid material and a surface member of soft material covering the exposed surface of said core member, said surface member of soft material covering said exposed surface of said core member of said base part having a relief between said surface member of soft material and said core member of rigid material for inward deflection of said surface member at said relief when said housing is rotated about said substantially vertical axis toward the front of said vehicle body.

7. A door mirror as recited in claim 6, wherein said surface member of said material covering the exposed surface of said core member of said base part has a portion extending forward of said substantially vertical axis toward said front of said vehicle body and said relief between said surface member and said core member is between said forward extending portion of the surface member and said core member of said base part.

8. A door mirror as recited in claim 7, wherein said core member of rigid material of said housing has a through-hole therein for inward deflection of said soft material of said housing when said housing is rotated about said substantially vertical axis toward the front of said vehicle body and the surface member on the through-hole of said housing abuts the forward extending portion of said base part.

9. A door mirror of a vehicle comprising a base part mounted to a vehicle body and a housing which is supported on the base part rotatably around a substantially vertical axis and having a mirror thereon, said base part and said housing each having a core member of a rigid material and a surface member of soft material covering the exposed surface of said core member, said core member of said housing having a through-hole therein for inward deflection of said surface member of said housing when said housing is rotated about said substantially vertical axis toward the front of said vehicle body.

* * * * *